(12) United States Patent
Suzuki (10) Patent No.: US 12,492,755 B2
(45) Date of Patent: Dec. 9, 2025

(54) SWITCHING DEVICE

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/748,539

(22) Filed: Jun. 20, 2024

(65) Prior Publication Data
US 2025/0043872 A1 Feb. 6, 2025

(30) Foreign Application Priority Data
Aug. 2, 2023 (JP) ................. 2023-126378

(51) Int. Cl.
*F16K 11/074* (2006.01)
*F16K 11/085* (2006.01)

(52) U.S. Cl.
CPC ........ *F16K 11/074* (2013.01); *F16K 11/0856* (2013.01); *F16K 11/0853* (2013.01)

(58) Field of Classification Search
CPC . F16K 11/074; F16K 11/0853; F16K 11/0856
See application file for complete search history.

(56) References Cited

U.S. PATENT DOCUMENTS

| | | | |
|---|---|---|---|
| 6,453,725 B1 * | 9/2002 | Dahlgren | G01N 30/20 137/869 |
| 8,813,785 B2 * | 8/2014 | Wan | F16K 11/02 137/240 |
| 2021/0301691 A1 | 9/2021 | Hasegawa et al. | |
| 2021/0331554 A1 | 10/2021 | Mancini et al. | |

FOREIGN PATENT DOCUMENTS

JP   2021-154767 A   10/2021

* cited by examiner

*Primary Examiner* — Michael R Reid
(74) *Attorney, Agent, or Firm* — Oliff PLC (57) ABSTRACT

The switching device includes a ten-way valve. The ten-way valve includes a lower body (first valve body), an upper body (second valve body), and a drive plate (third valve body). The switching device rotates each of the upper body and the drive plate relative to the lower body to switch an overlapping state in the Z direction (axial direction) between an opening (first opening) of each of the plurality of grooves (first grooves) of the lower body, a groove (second groove) of the upper body, and a through hole of the drive plate.

1 Claim, 9 Drawing Sheets

SWITCHING DEVICE

CROSS-REFERENCE TO RELATED APPLICATION

This application claims priority to Japanese Patent Application No. 2023-126378 filed on Aug. 2, 2023, incorporated herein by reference in its entirety.

BACKGROUND

1. Technical Field

The present disclosure relates to a switching device.

2. Description of Related Art

Japanese Unexamined Patent Application Publication No. 2021-154767 (JP 2021-154767 A) discloses a heat management system including a switching valve for switching a flow path of a heat medium.

SUMMARY

In JP 2021-154767 A, the flow path of the heat medium is switched by the switching valve as described above. There is a demand for a switching device that can efficiently switch a flow path of a heat medium.

The present disclosure has been made to solve the above issue, and an object thereof is to provide a switching device that can efficiently switch a flow path of a heat medium.

A switching device according to a first aspect of the present disclosure is a switching device to be provided in a heat management circuit through which a heat medium flows. The switching device includes:
  a valve body unit; and
  a plurality of flow pipes connected to the valve body unit.
  The valve body unit includes:
  a disc-shaped first valve body;
  a disc-shaped second valve body provided to be rotatable relative to the first valve body about a rotation center line, and disposed on one side of the first valve body in an axial direction in which the rotation center line extends; and
  a disc-shaped third valve body sandwiched in the axial direction by the first valve body and the second valve body, and provided to be rotatable relative to the first valve body about the rotation center line.
  The first valve body includes:
  an outer peripheral wall extending annularly about the rotation center line;
  an inner peripheral wall extending annularly about the rotation center line and provided closer to the rotation center line than the outer peripheral wall; and
  ten partition walls provided to partition a space between the inner peripheral wall and the outer peripheral wall in a circumferential direction about the rotation center line.
  The first valve body has ten first grooves defined by the ten partition walls between the outer peripheral wall and the inner peripheral wall.
  Each of the ten first grooves includes a first opening that is open toward the second valve body, and a second opening provided in the outer peripheral wall.
  The second opening of part of the ten first grooves allows the heat medium to flow into the first valve body through the flow pipes, and the second opening of the remaining part of the ten first grooves allows the heat medium to flow out of the first valve body through the flow pipes.
  The second valve body has a plurality of fan-shaped second grooves that extends circumferentially about the rotation center line and is open toward the first valve body.
  The third valve body has a plurality of through holes that passes through the third valve body in the axial direction and is arranged circumferentially about the rotation center line.
  The second valve body and the third valve body are configured to rotate relative to the first valve body to switch states of overlap of the first openings of the ten first grooves, the second grooves, and the through holes in the axial direction.

In the switching device according to the first aspect of the present disclosure, the states of overlap of the first openings of the ten first grooves, the second grooves, and the through holes in the axial direction are switched as described above. Thus, the flow path of the heat medium can easily be switched only by switching the states of overlap. As a result, the flow path of the heat medium can be switched efficiently.

A switching device according to a second aspect of the present disclosure is a switching device to be provided in a heat management circuit through which a heat medium flows. The switching device includes:
  a valve body unit; and
  a plurality of flow pipes connected to the valve body unit.
  The valve body unit includes:
  a columnar inner peripheral unit integrated by stacking a disc-shaped first portion and a disc-shaped second portion; and
  an annular outer peripheral unit provided to be rotatable relative to the inner peripheral unit about a rotation center line, and disposed to surround the inner peripheral unit from an outer peripheral side.
  The inner peripheral unit includes a first outer peripheral wall extending annularly about the rotation center line.
  Assuming that a direction in which the rotation center line extends is an axial direction, the inner peripheral unit has two first inner peripheral grooves each connecting two first inner peripheral openings provided at positions on the first outer peripheral wall corresponding to the first portion in the axial direction, and two second inner peripheral grooves each connecting two second inner peripheral openings provided at positions on the first outer peripheral wall corresponding to the second portion in the axial direction.
  The two first inner peripheral openings are spaced apart from each other in a circumferential direction about the rotation center line.
  The two second inner peripheral openings are spaced apart from each other in the circumferential direction.
  The outer peripheral unit includes:
  a second outer peripheral wall extending annularly about the rotation center line; an inner peripheral wall extending annularly about the rotation center line and provided closer to the rotation center line than the second outer peripheral wall; and
  a plurality of partition walls that partitions a space between the second outer peripheral wall and the inner peripheral wall in the circumferential direction.
  Eight outer peripheral grooves defined by the partition walls are provided between the second outer peripheral wall and the inner peripheral wall.
  The inner peripheral wall has ten first outer peripheral openings arranged in the circumferential direction.
  The eight outer peripheral grooves communicate with second outer peripheral openings provided in the second outer peripheral wall.

Part of the eight outer peripheral grooves allows the heat medium to flow into the outer peripheral unit through the flow pipes, and the remaining part of the eight outer peripheral grooves allows the heat medium to flow out of the outer peripheral unit through the flow pipes.

The outer peripheral unit is configured to rotate relative to the inner peripheral unit to switch states of overlap of the ten first outer peripheral openings of the outer peripheral unit, the two first inner peripheral openings, and the two second inner peripheral openings in a radial direction.

In the switching device according to the second aspect of the present disclosure, the states of overlap of the ten first outer peripheral openings of the outer peripheral unit, the two first inner peripheral openings, and the two second inner peripheral openings in the radial direction are switched as described above. Thus, the flow path of the heat medium can easily be switched only by switching the states of overlap. As a result, the flow path of the heat medium can be switched efficiently.

According to the present disclosure, the flow path of the heat medium can be switched efficiently by using the switching device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a heat management system according to the present disclosure will be described. Heat management systems are mounted, for example, in an electrified vehicle (not shown). Electrified vehicle on which the heat management system is mounted is preferably vehicles on which a battery for driving is mounted, for example Battery Electric Vehicle (BEV), Hybrid Electric Vehicle (HEV), Plug-in Hybrid Electric Vehicle (PHEV), and Fuel Cell Electric Vehicle (FCEV). However, the use of the heat management system according to the present disclosure is not limited to a vehicle.

First Embodiment

Overall Configuration

Figure 1:
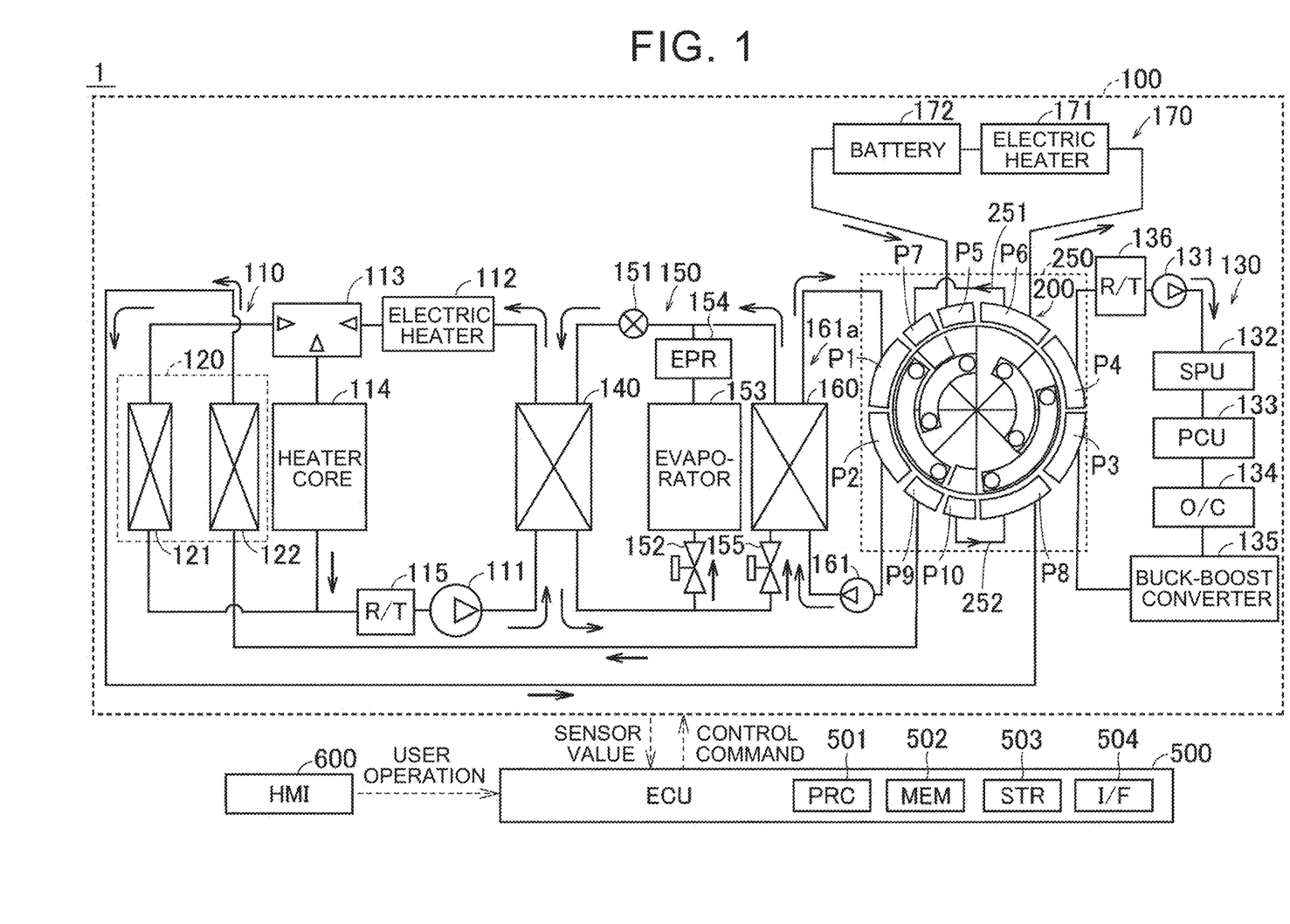
FIG. 1 is a diagram illustrating a configuration of a heat management system according to a first embodiment.

FIG. 1 is a diagram illustrating an example of an overall configuration of a heat management system 1 according to a first embodiment of the present disclosure. The heat management system 1 includes a heat management circuit 100, an Electronic Control Unit (ECU) 500, and a Human Machine Interface (HMI) 600.

The heat management circuit 100 is configured to allow the heat medium to flow. The heat management circuit 100 includes, for example, a high-temperature circuit 110, a radiator 120, a unit circuit 130, a condenser 140, a refrigeration cycle 150, a chiller 160, a battery circuit 170, and a switching device 250. Switching device 250 includes a ten-way valve 200. The ten-way valve 200 is an example of a "valve body unit" of the present disclosure.

The high-temperature circuit 110 includes, for example, a water pump (W/P) 111, electric heater 112, three-way valve 113, heater core 114, and a reservoir tank (R/T) 115.

The radiator 120 includes a High Temperature (HT) radiator 121 and a Low Temperature (LT) radiator 122. In the low-temperature radiator 122, the heat medium and the outside air are heat-exchanged.

The unit circuit 130 includes, for example, a water pump 131, a Smart Power Unit (SPU) 132, a Power Control Unit (PCU) 133, an oil cooler (O/C) 134, a step-up/down converter 135, and a reservoir tank 136.

The condenser 140 is connected to both the high temperature circuit 110 and the refrigeration cycle 150. The refrigeration cycle 150 includes, for example, a compressor 151, an expansion valve 152, an evaporator 153, an Evaporative Pressure Regulator (EPR) 154, and an expansion valve 155.

The chiller 160 is connected to both the refrigeration cycle 150 and the flow path 161a. In the chiller 160, the heat medium flowing in the flow path 161a and the medium circulating in the refrigeration cycle 150 are heat-exchanged. The flow path 161a is a flow path that connects a port P1, which will be described later, of the ten-way valve 200 and a port P2, which will be described later, of the ten-way valve 200. A water pump (W/P) 161 is provided in the flow path 161a.

The battery circuit 170 includes, for example, an electric heater 171 and a battery 172. The electric heater 171 raises the temperature of the heat medium of the battery circuit 170.

ECU 500 controls the heat management circuit 100. ECU 500 includes a processor 501, a memory 502, a storage 503, and an interface 504.

ECU 500 generates a control command based on sensor values acquired from various sensors included in the heat management circuit 100, user manipulation received by HMI 600, and the like, and outputs the generated control command to the heat management circuit 100. Thus, for example, the states of the three-way valve 113 and the ten-way valve 200 are switched.

HMI 600 is a display with a touch panel, an operating panel, a console, or the like. HMI 600 receives a user manipulation for controlling the heat management-system 1. HMI 600 outputs an ECU 500 indicating a user manipulation.

The ten-way valve 200 is provided with ten port P1. The port P1 is an inlet port through which the heating medium flows from the chiller 160 (flow path 161*a*). The port P2 is an outlet port through which the heat medium flows toward the chiller 160 (flow path 161*a*). The port P3 is an inlet port through which the heating medium flows from the unit circuit 130 (PCU 133 or the like). The port P4 is an outlet port through which the heating medium flows toward the unit circuit 130 (PCU 133 or the like). The port P5 is an inlet port through which the heat medium flows from the battery circuit 170. The port P6 is an outlet port that exits the thermal medium toward the battery circuit 170. The port P7 is an inlet port through which the thermal medium flowing out of the port P6 enters through the bypass path 251. The port P8 is an inlet port through which the thermal medium flows from the low-temperature radiator 122. The port P9 is an outlet port through which the thermal medium flows toward the low-temperature radiator 122. The port P10 is an outlet port through which the heat medium flows toward the port P8 to allow the heat medium to flow out to the bypass path 252.

Further, a flow pipe connected to each of P10 from the port P1 is an exemplary "flow pipe" of the present disclosure. The flow pipes include the flow paths of the battery circuit 170, the flow paths of the unit circuit 130, the flow paths connecting the ten-way 200 and the radiator 120, the flow path 161*a*, bypass paths 251, and bypass paths 252.

ECU 500 controls the condition of the ten-way valve 200. Thus, the flow path of the heat medium in the ten-way valve 200 is switched. As a result, the flow path of the heat medium in the heat management circuit 100 is switched.

Figure 2:
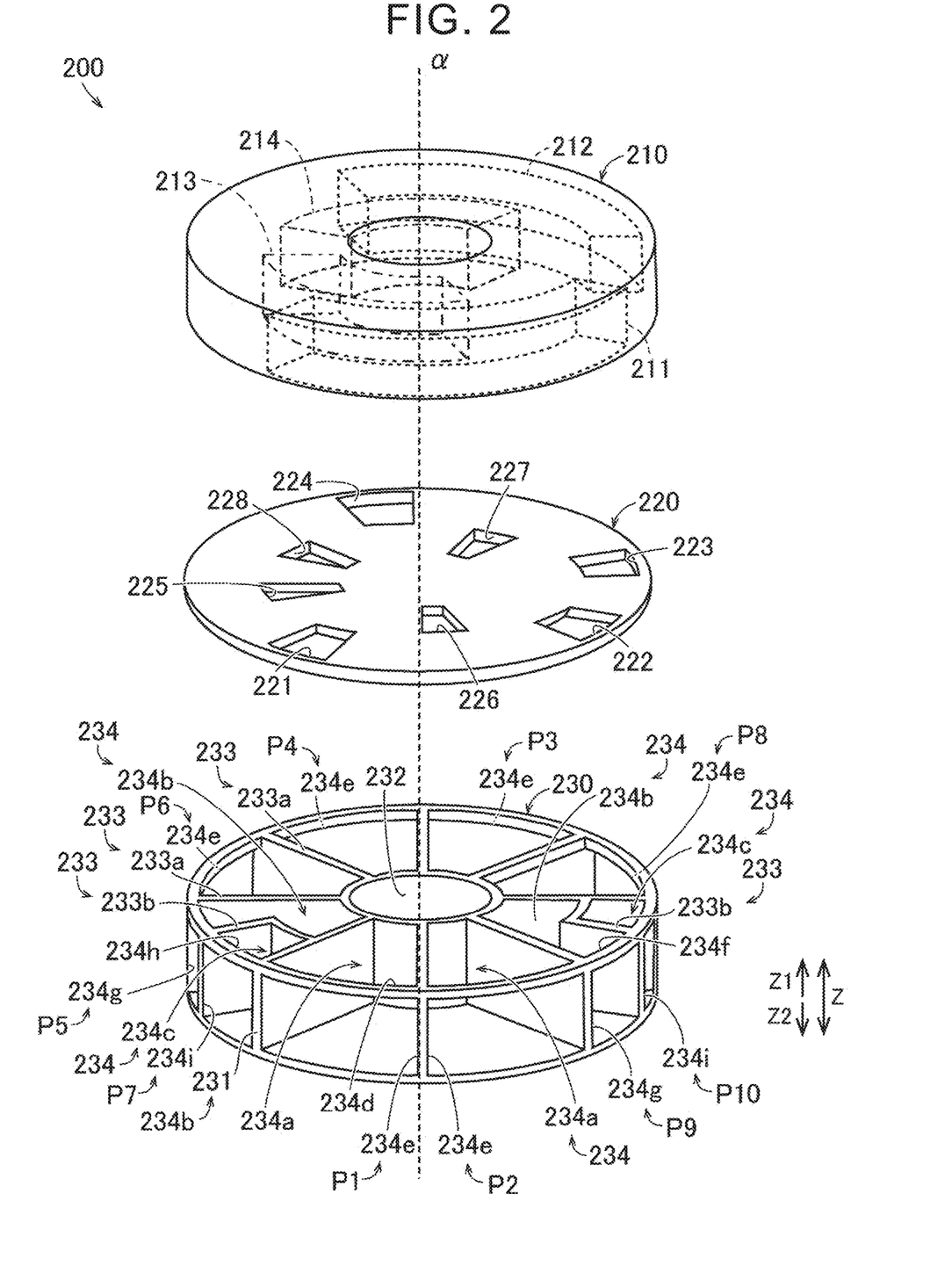
FIG. 2 is an exploded perspective view showing a configuration of a ten-way valve according to the first embodiment.

FIG. 2 is an exploded perspective view showing the configuration of the ten-way valve 200. The ten-way valve 200 includes a disc-shaped upper body 210, a disc-shaped drive plate 220, and a disc-shaped lower body 230. The upper body 210, the drive plate 220, and the lower body 230 are arranged (stacked) in this order from Z1 side. That is, the drive plate 220 is sandwiched in the Z direction by the upper body 210 and the lower body 230. The Z direction is a direction in which the rotation center line a extends. The Z direction is an example of the "axial direction" of the present disclosure. The upper body 210 and the drive plate 220 are examples of the "second valve body" and the "third valve body" of the present disclosure, respectively. The lower body 230 is an example of a "first valve body" of the present disclosure.

The lower body 230 is fixed without rotation. The upper body 210 and the drive plate 220 rotate integrally Z1 the lower body 230 about the rotational center line a. As a result, the relative positions (rotation angles in the circumferential direction) of the lower body 230, the upper body 210, and the drive plate 220 are changed. The upper body 210 and the drive plate 220 may be fixed, and the lower body 230 may be rotated.

The upper body 210 has an annular shape. The upper body 210 is provided with a groove 214 from the groove 211. Each of the grooves 211 to 214 is formed in a fan shape so as to extend circumferentially around the rotation center line a. Each of the grooves 214 from the groove 211 is open toward the lower body 230 (Z2). Note that each of the grooves 211 to 214 is an example of a "second groove" of the present disclosure.

The groove 211 and the groove 212 are arranged side by side in the circumferential direction in the outer peripheral side region of the upper body 210. Specifically, each of the groove 211 and the groove 212 is about 112. It has a sector shape with a central angle of 5 degrees.

Each of the groove 213 and the groove 214 is disposed so as to face each other in an inner peripheral region of the upper body 210 that is closer to the groove 211 and the groove 212. Each of the groove 213 and the groove 214 is approximately 112. It has a sector shape with a central angle of 5 degrees.

The drive plate 220 is provided with a through hole 228 through the through hole 221. Each of the through holes 221 to 228 is formed so as to penetrate the drive plate 220 in the Z direction. Each of the through holes 221 to 228 is formed in a fan shape so as to extend circumferentially around the rotation center line a. The through holes 221 to 228 are offset from each other in the circumferential direction so as not to overlap each other in the radial direction.

The through holes 221 to 224 are arranged side by side in the circumferential direction in the outer peripheral side region of the drive plate 220. Each of the through hole 221 and the through hole 222 is provided at a position overlapping with the groove 211 of the upper body 210. Each of the through hole 223 and the through hole 224 is provided at a position overlapping the groove 212 of the upper body 210 when viewed along the Z-direction.

The through holes 225 to 228 are arranged in the circumferential direction in the inner peripheral region of the drive plate 220 from the through hole 221 to the through hole 224. Each of the through hole 225 and the through hole 226 is provided at a position overlapping the groove 213 of the upper body 210 when viewed along the Z-direction. Each of the through hole 227 and the through hole 228 is provided at a position overlapping the groove 214 of the upper body 210 when viewed along the Z-direction.

The lower body 230 includes an outer peripheral wall 231, an inner peripheral wall 232, and ten partition walls 233. The outer peripheral wall 231 is provided so as to extend annularly about the rotation center line a. The inner peripheral wall 232 extends annularly around the rotation center line a and is formed closer to the rotation center line a than the outer peripheral wall 231.

The ten partition walls 233 include eight partition walls 233*a* and two partition walls 233*b*. Each of the eight partition wall 233*a* is formed to extend radially and is provided to connect the inner peripheral wall 232 and the outer peripheral wall 231. The eight partition walls 233*a* are arranged at equal intervals in the circumferential direction around the rotational center line a.

Each of the two partition walls 233*b* is provided to connect the partition wall 233*a* and the outer peripheral wall 231. Each of the two partition walls 233*b* is formed in an L-shape when viewed from Z1.

The lower body 230 is provided with ten grooves 234 formed by ten partition walls 233 between the outer peripheral wall 231 and the inner peripheral wall 232. The ten grooves 234 include six grooves 234*a*, two grooves 234*b*, and two grooves 234*c*. Note that the grooves 234 (234*a* to 234*c*) are exemplary "first grooves" of the present disclosure.

The groove 234*a* is a fan-shaped space formed by the outer peripheral wall 231, the inner peripheral wall 232, and the two partition walls 233*a*. The groove 234*b* is a space formed by the outer peripheral wall 231, the inner peripheral wall 232, the two partition walls 233*a*, and the partition walls 233b. The groove 234c is a fan-shaped space formed by the outer peripheral wall 231, one partition wall 233a, and the partition wall 233b.

The groove 234a has an opening 234d in which the upper body 210 side (Z1 side) is opened, and an opening 234e formed in the outer peripheral wall 231. The groove 234b has an opening 234f in which the upper body 210 is open, and an opening 234g formed in the outer peripheral wall 231. The groove 234c has an opening 234h in which the upper body 210 is open, and an opening 234i formed in the outer peripheral wall 231. Each of the opening 234d, the opening 234f, and the opening 234h is an exemplary "first opening" of the present disclosure. Each of the opening 234e, the opening 234g, and the opening 234i is an exemplary "second opening" of the present disclosure.

The opening 234e, the opening 234g, and the opening 234i are circumferentially arranged side by side in the outer peripheral wall 231.

The opening 234e of six grooves 234a correspond to (communicate with) P4, P6 and P8 from the port P1, respectively. The opening 234g of two grooves 234b correspond to (communicate with) the port P5 and P9, respectively. The opening 234i of two grooves 234c correspond to (communicate with) the port P7 and P10, respectively.

FIGS. 3 to 10 show a circuit pattern A to H heat management circuit 100 can be formed by the ten-way valve 200. Note that, in FIGS. 3 to 10, open circles overlapping the groove 214 from the groove 211 indicate the position of the through hole 228 from the through hole 221 of the drive plate 220. In FIG. 3 to FIG. 10, for the sake of simplicity, reference numerals of the through holes 221 to 228 are omitted.

In the first embodiment, the ten-way valve 200 rotates each of the drive plate 220 and the upper body 210, whereby the opening (234d, 234f, 234h) of each of the ten grooves 234 (see FIG. 2) of the lower body 230, the groove 214 from the groove 211 of the upper body 210, and the through hole 228 from the through hole 221 of the drive plate 220 are switched in the overlapping state in the Z-direction (overlapping state when viewed along the Z-direction).

Figure 3:
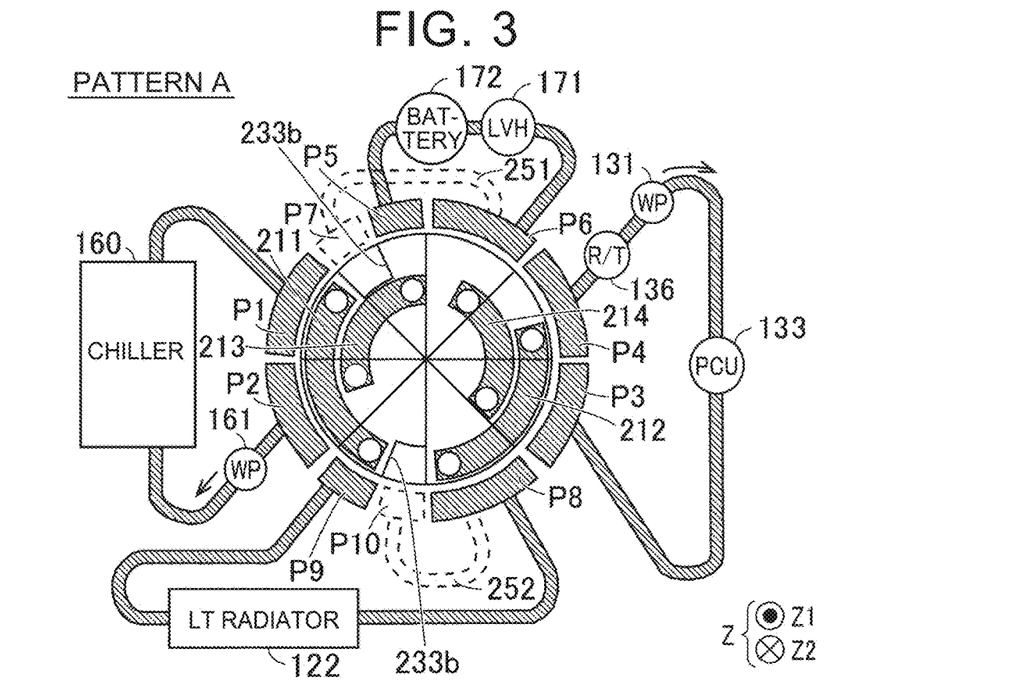
FIG. 3 is a diagram illustrating a circuit pattern A of the heat management circuit according to the first embodiment.

As shown in FIG. 3, in the pattern A, the groove 211 of the upper body 210, the through hole 221 and the through hole 222 of the drive plate 220, and the groove 234a (P1) and the groove 234b (P9) of the lower body 230 overlap in the Z-direction. Accordingly, the port P1 and the port P9 communicate with each other.

In the pattern A, the groove 212 of the upper body 210, the through hole 223 and the through hole 224 of the drive plate 220, and the groove 234a (P4) and the groove 234a (P8) of the lower body 230 overlap each other in the Z-direction. Accordingly, the port P4 and the port P8 communicate with each other.

In the pattern A, the groove 213 of the upper body 210, the through hole 225 and the through hole 226 of the drive plate 220, and the groove 234b (P5) and the groove 234a (P2) of the lower body 230 overlap each other in the Z-direction. Accordingly, the port P2 and the port P5 communicate with each other.

In the pattern A, the groove 214 of the upper body 210, the through holes 227 and 228 of the drive plate 220, and the groove 234a (P6) and the groove 234a (P3) of the lower body 230 overlap each other in the Z-direction. Accordingly, the port P3 and the port P6 communicate with each other.

In the circuit pattern A, a closed circuit in which the heat medium flows is formed in the order of PCU 133, the battery 172, the chiller 160, and the low-temperature radiator 122. In the circuit pattern A, PCU 133 and battery 172 can be cooled by the low-temperature radiator 122 and the chiller 160. In addition, heat pump heating can be performed using the heat of PCU 133 and the battery 172.

Figure 4:
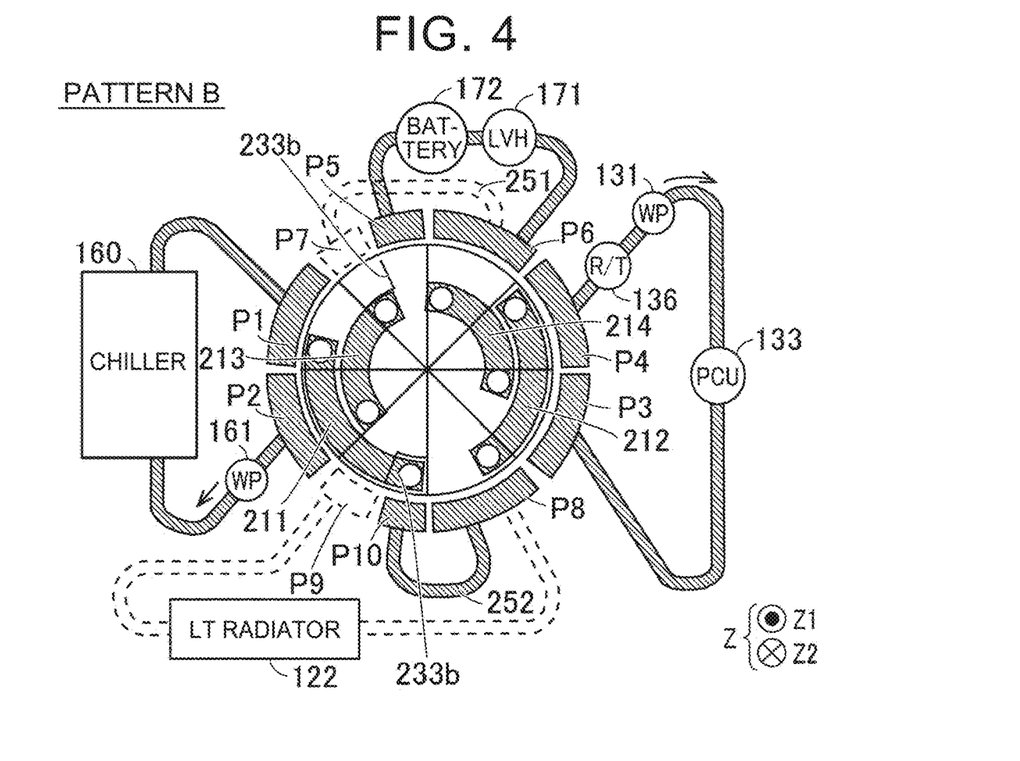
FIG. 4 is a diagram illustrating a circuit pattern B of the heat management circuit according to the first embodiment.

As shown in FIG. 4, in the pattern B, the groove 211 of the upper body 210, the through hole 221 and the through hole 222 of the drive plate 220, and the groove 234a (P1) and the groove 234c (P10) of the lower body 230 overlap in the Z-direction. Accordingly, the port P1 and the port P10 communicate with each other.

In the pattern B, the groove 212 of the upper body 210, the through holes 223 and 224 of the drive plate 220, and the groove 234a (P4) and the groove 234a (P8) of the lower body 230 overlap in the Z-direction. Accordingly, the port P4 and the port P8 communicate with each other.

In the pattern B, the groove 213 of the upper body 210, the through hole 225 and the through hole 226 of the drive plate 220, and the groove 234b (P5) and the groove 234a (P2) of the lower body 230 overlap each other in the Z-direction. Accordingly, the port P2 and the port P5 communicate with each other.

In the pattern B, the groove 214 of the upper body 210, the through hole 227 and the through hole 228 of the drive plate 220, and the groove 234a (P6) and the groove 234a (P3) of the lower body 230 overlap each other in the Z-direction. Accordingly, the port P3 and the port P6 communicate with each other.

In the circuit pattern B, a first closed circuit in which the heat medium flows in the order of PCU 133, the battery 172, and the chiller 160, and a second closed circuit in which the low-temperature radiator 122 is independent (disconnected) are formed. In the circuit pattern B, the temperature of the battery 172 can be raised and heated by the heat of PCU 133, and the heat pump can be heated by the heat of PCU 133 and the battery 172. In addition, heat dissipation in the low-temperature radiator 122 is suppressed.

Figure 5:
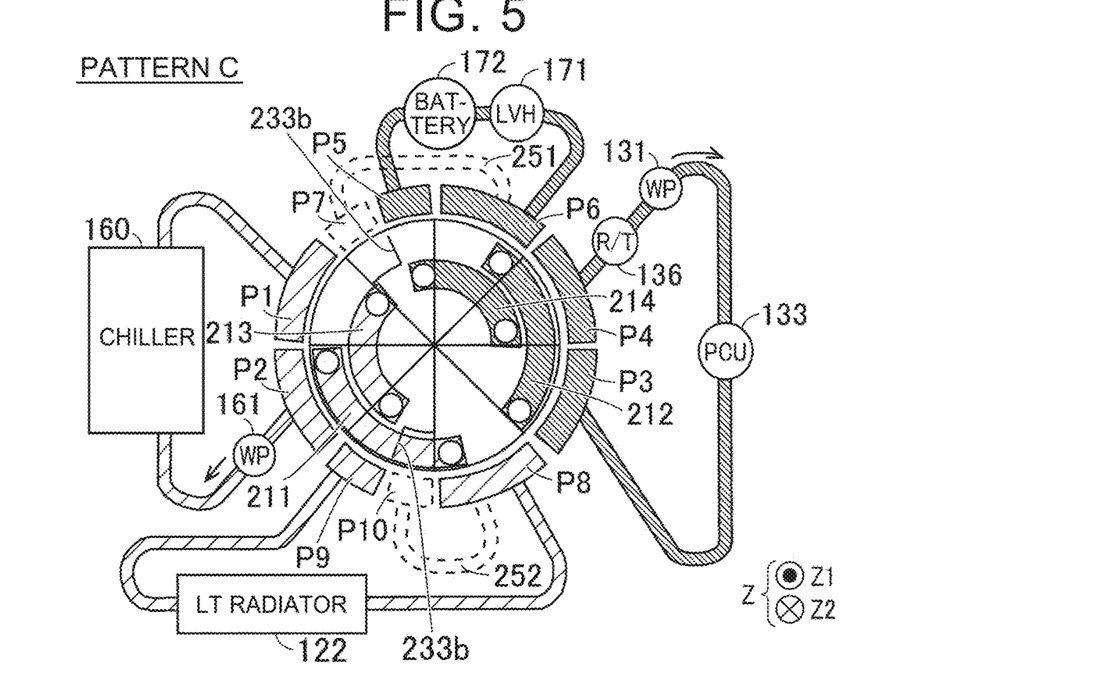
FIG. 5 is a diagram illustrating a circuit pattern C of the heat management circuit according to the first embodiment.

As shown in FIG. 5, in the pattern C, the groove 211 of the upper body 210, the through hole 221 and the through hole 222 of the drive plate 220, and the groove 234a (P2) and the groove 234a (P8) of the lower body 230 overlap in the Z-direction. Accordingly, the port P2 and the port P8 communicate with each other.

In the pattern C, the groove 212 of the upper body 210, the through hole 223 and the through hole 224 of the drive plate 220, and the groove 234a (P6) and the groove 234a (P3) of the lower body 230 overlap each other in the Z-direction. Accordingly, the port P3 and the port P6 communicate with each other.

In the pattern C, the groove 213 of the upper body 210, the through hole 225 and the through hole 226 of the drive plate 220, and the groove 234a (P1) and the groove 234b (P9) of the lower body 230 overlap each other in the Z-direction. Accordingly, the port P1 and the port P9 communicate with each other.

In the pattern C, the groove 214 of the upper body 210, the through hole 227 and the through hole 228 of the drive plate 220, and the groove 234b (P5) and the groove 234a (P4) of the lower body 230 overlap in the Z-direction. Accordingly, the port P4 and the port P5 communicate with each other.

In the circuit pattern C, a first closed circuit in which a heat medium flows through PCU 133 and the battery 172 and a second closed circuit in which a heat medium flows through the low-temperature radiator 122 and the chiller 160 are formed. In the circuit pattern C, the temperature of the battery 172 can be raised by the heat of PCU 133, and heat pump heating using the outside air can be performed.

Figure 6:
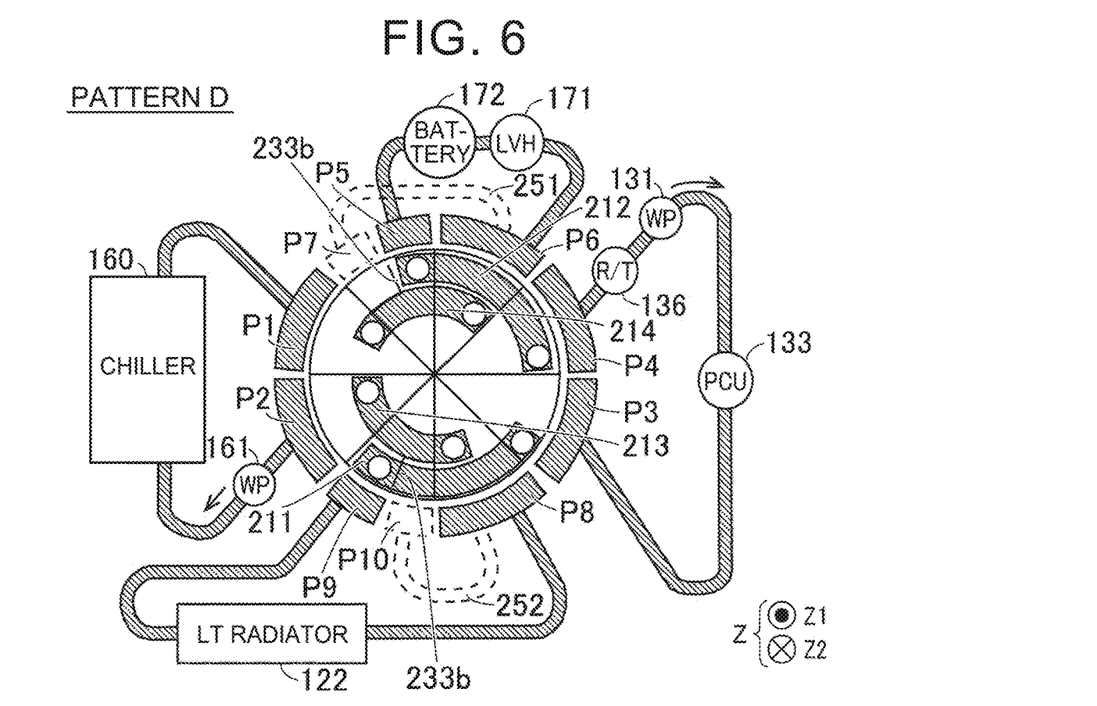
FIG. 6 is a diagram illustrating a circuit pattern D of the heat management circuit according to the first embodiment.

As shown in FIG. 6, in the pattern D, the groove 211 of the upper body 210, the through hole 221 and the through hole 222 of the drive plate 220, and the groove 234a (P3) and the groove 234b (P9) of the lower body 230 overlap each other in the Z-direction. Accordingly, the port P3 and the port P9 communicate with each other.

In the pattern D, the groove 212 of the upper body 210, the through hole 223 and the through hole 224 of the drive plate 220, and the groove 234a (P4) and the groove 234b (P5) of the lower body 230 overlap each other in the Z-direction. Accordingly, the port P4 and the port P5 communicate with each other.

In the pattern D, the groove 213 of the upper body 210, the through hole 225 and the through hole 226 of the drive plate 220, and the groove 234a (P8) and the groove 234a (P2) of the lower body 230 overlap in the Z-direction. Accordingly, the port P2 and the port P8 communicate with each other.

In the pattern D, the groove 214 of the upper body 210, the through hole 227 and the through hole 228 of the drive plate 220, and the groove 234a (P6) and the groove 234a (P1) of the lower body 230 overlap in the Z-direction. Accordingly, the port P1 and the port P6 communicate with each other.

In the circuit pattern D, a closed circuit in which the heat medium flows is formed in the order of PCU 133, the low-temperature radiator 122, the chiller 160, and the battery 172. The circuit pattern D is a circuit in which the order in which the circuit pattern A and the heat medium flow is different from each other.

Figure 7:
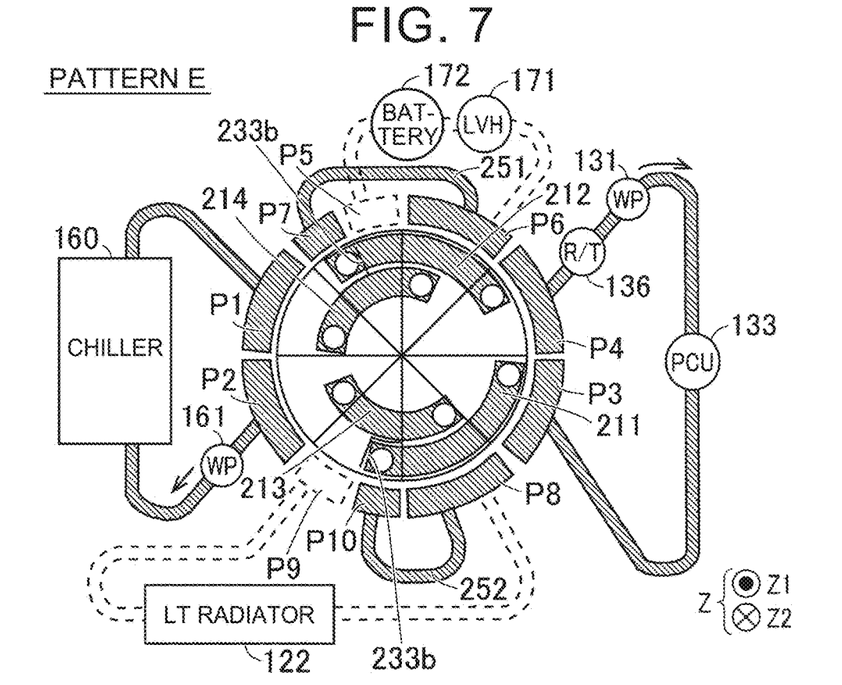
FIG. 7 is a diagram illustrating a circuit pattern E of the heat management circuit according to the first embodiment.

As shown in FIG. 7, in the pattern E, the groove 211 of the upper body 210, the through hole 221 and the through hole 222 of the drive plate 220, and the groove 234a (P3) and the groove 234c (P10) of the lower body 230 overlap in the Z-direction. Accordingly, the port P3 and the port P10 communicate with each other.

In the pattern E, the groove 212 of the upper body 210, the through hole 223 and the through hole 224 of the drive plate 220, and the groove 234a (P4) and the groove 234c (P7) of the lower body 230 overlap each other in the Z-direction. Accordingly, the port P4 and the port P7 communicate with each other.

In the pattern E, the groove 213 of the upper body 210, the through hole 225 and the through hole 226 of the drive plate 220, and the groove 234a (P2) and the groove 234a (P8) of the lower body 230 overlap in the Z-direction. Accordingly, the port P2 and the port P8 communicate with each other.

In the pattern E, the groove 214 of the upper body 210, the through hole 227 and the through hole 228 of the drive plate 220, and the groove 234a (P6) and the groove 234a (P1) of the lower body 230 overlap in the Z-direction. Accordingly, the port P1 and the port P6 communicate with each other.

In the circuit pattern E, a first closed circuit in which the heat medium flows in the order of PCU 133, the bypass path 252, the chiller 160, and the bypass path 251 is formed, and each of the low-temperature radiator 122 and the battery 172 is independently (disconnected). In the circuit pattern E, PCU 133 can be cooled, and heat pump heating using waste heat of PCU 133 can be performed.

Figure 8:
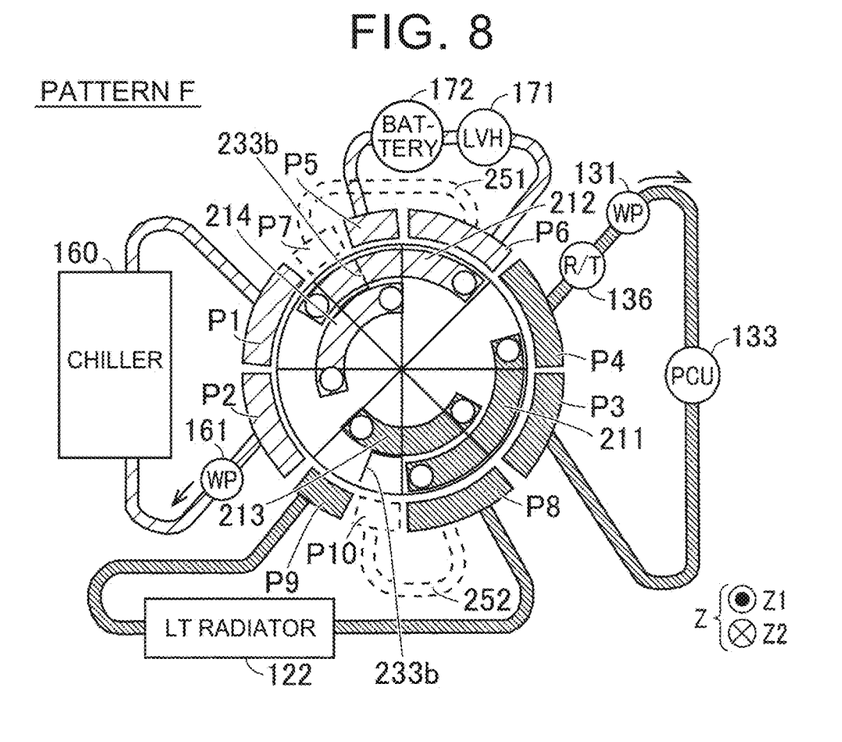
FIG. 8 is a diagram illustrating a circuit pattern F of the heat management circuit according to the first embodiment.

As shown in FIG. 8, in the pattern F, the groove 211 of the upper body 210, the through hole 221 and the through hole 222 of the drive plate 220, and the groove 234a (P4) and the groove 234a (P8) of the lower body 230 overlap in the Z-direction. Accordingly, the port P4 and the port P8 communicate with each other.

In the pattern F, the groove 212 of the upper body 210, the through hole 223 and the through hole 224 of the drive plate 220, and the groove 234a (P6) and the groove 234a (P1) of the lower body 230 overlap each other in the Z-direction. Accordingly, the port P1 and the port P6 communicate with each other.

In the pattern F, the groove 213 of the upper body 210, the through hole 225 and the through hole 226 of the drive plate 220, and the groove 234a (P3) and the groove 234b (P9) of the lower body 230 overlap each other in the Z-direction. Accordingly, the port P3 and the port P9 communicate with each other.

In the pattern F, the groove 214 of the upper body 210, the through hole 227 and the through hole 228 of the drive plate 220, and the groove 234b (P5) and the groove 234a (P2) of the lower body 230 overlap each other in the Z-direction. Accordingly, the port P2 and the port P5 communicate with each other.

In the circuit pattern F, a first closed circuit in which a heat medium flows through PCU 133 and the low-temperature radiator 122 and a second closed circuit in which a heat medium flows through the battery 172 and the chiller 160 are formed. In the circuit pattern F, PCU 133 can be cooled by the low-temperature radiator 122, and the battery 172 can be cooled by the chiller 160.

Figure 9:
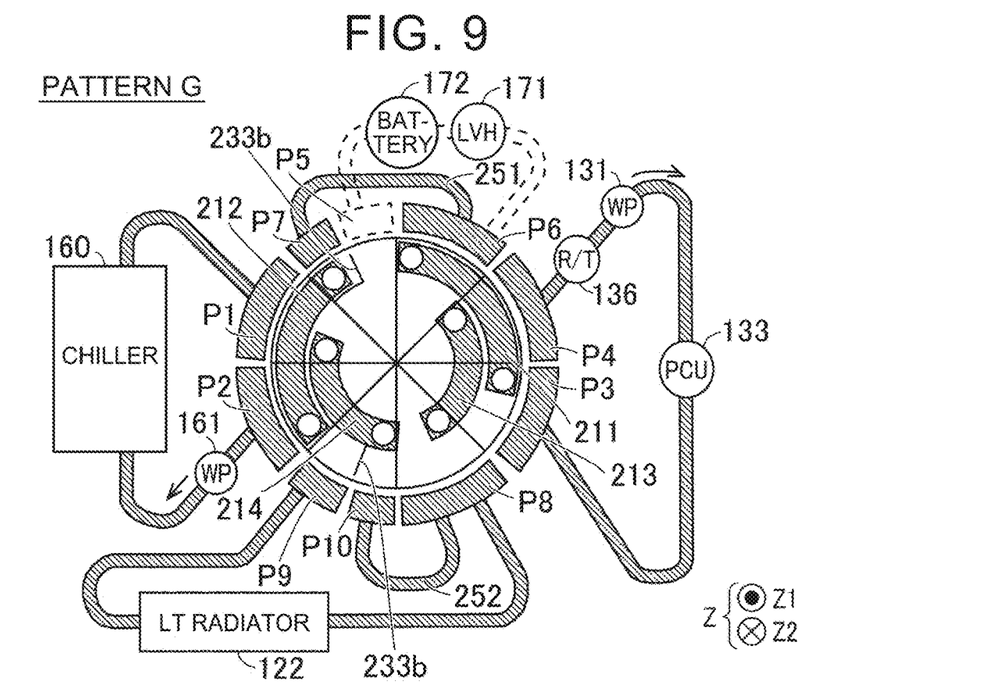
FIG. 9 is a diagram illustrating a circuit pattern G of the heat management circuit according to the first embodiment.

As shown in FIG. 9, in the pattern G, the groove 211 of the upper body 210, the through hole 221 and the through hole 222 of the drive plate 220, and the groove 234a (P6) and the groove 234a (P3) of the lower body 230 overlap in the Z-direction. Accordingly, the port P3 and the port P6 communicate with each other.

In the pattern G, the groove 212 of the upper body 210, the through hole 223 and the through hole 224 of the drive plate 220, and the groove 234c (P7) and the groove 234a (P2) of the lower body 230 overlap each other in the Z-direction. Accordingly, the port P2 and the port P7 communicate with each other.

In the pattern G, the groove 213 of the upper body 210, the through hole 225 and the through hole 226 of the drive plate 220, and the groove 234a (P4) and the groove 234a (P8) of the lower body 230 overlap in the Z-direction. Accordingly, the port P4 and the port P8 communicate with each other.

In the pattern G, the groove 214 of the upper body 210, the through hole 227 and the through hole 228 of the drive plate 220, and the groove 234a (P1) and the groove 234b (P9) of the lower body 230 overlap in the Z-direction. Accordingly, the port P1 and the port P9 communicate with each other.

In the circuit pattern G, a first closed circuit through which the heat medium flows is formed in the order of PCU 133, the bypass path 251, the chiller 160, and the low-temperature radiator 122, and the battery 172 is independently (disconnected). In the circuit pattern G, heating can be performed by the heat of PCU 133, and excess heat can be dissipated from the low-temperature radiator 122. Further, the temperature drop of the battery 172 is suppressed.

Figure 10:
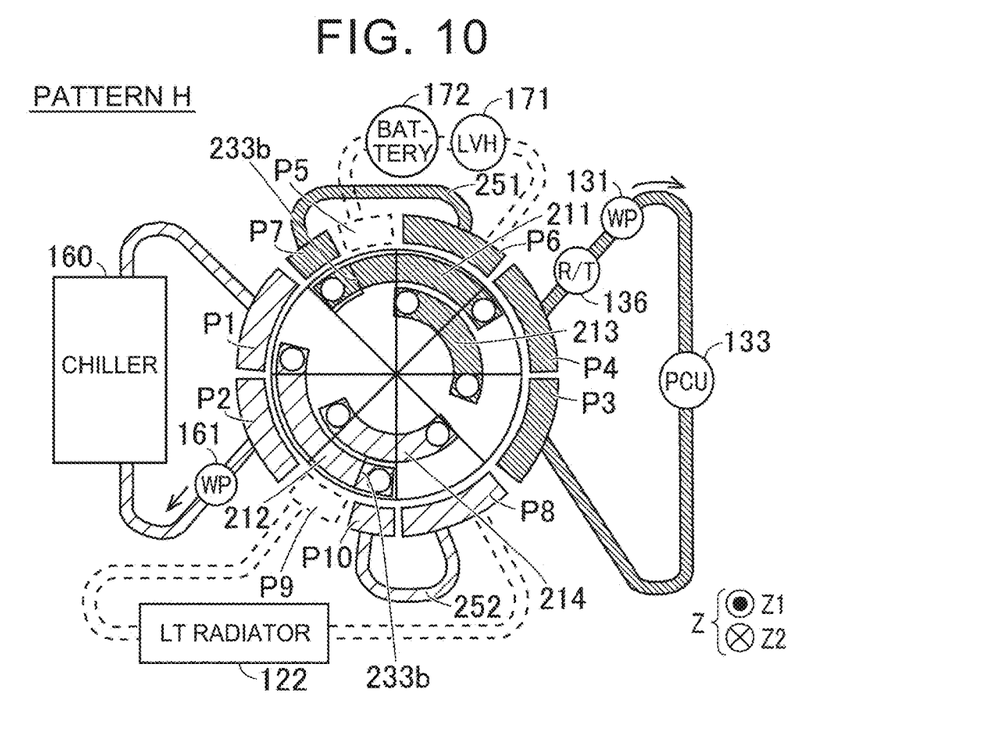
FIG. 10 is a diagram illustrating a circuit pattern H of the heat management circuit according to the first embodiment.

As shown in FIG. 10, in the pattern H, the groove 211 of the upper body 210, the through hole 221 and the through hole 222 of the drive plate 220, and the groove 234c (P7) and the groove 234a (P4) of the lower body 230 overlap in the Z-direction. Accordingly, the port P4 and the port P7 communicate with each other.

In the pattern H, the groove 212 of the upper body 210, the through hole 223 and the through hole 224 of the drive plate 220, and the groove 234a (P1) and the groove 234c (P10) of the lower body 230 overlap each other in the Z-direction. Accordingly, the port P1 and the port P10 communicate with each other.

In the pattern H, the groove 213 of the upper body 210, the through hole 225 and the through hole 226 of the drive plate 220, and the groove 234a (P6) and the groove 234a (P3) of the lower body 230 overlap in the Z-direction. Accordingly, the port P3 and the port P6 communicate with each other.

In the pattern H, the groove 214 of the upper body 210, the through hole 227 and the through hole 228 of the drive plate 220, and the groove 234a (P2) and the groove 234a (P8) of the lower body 230 overlap in the Z-direction. Accordingly, the port P2 and the port P8 communicate with each other.

In the circuit pattern H, a first closed circuit in which the heat medium flows through PCU 133 and the bypass path 251 and a second closed circuit in which the heat medium flows through the chiller 160 and the bypass path 252 are formed, and each of the low-temperature radiator 122 and the battery 172 is independently (separated). In the circuit pattern H, heat of PCU 133 can be stored. Heat pump heating using waste heat of PCU 133 is also feasible.

As described above, in the first embodiment, by the ten-way valve 200, it is possible to switch the state of the heat management circuit 100 from the circuit pattern A to any of H.

Second Embodiment

In the second embodiment, unlike the first embodiment in which the ten-way valve 200 is used, the ten-way valve 400 is used. The same components as those of the first embodiment are denoted by the same reference numerals as those of the first embodiment, and the repetitive description thereof will not be given.

Figure 11:
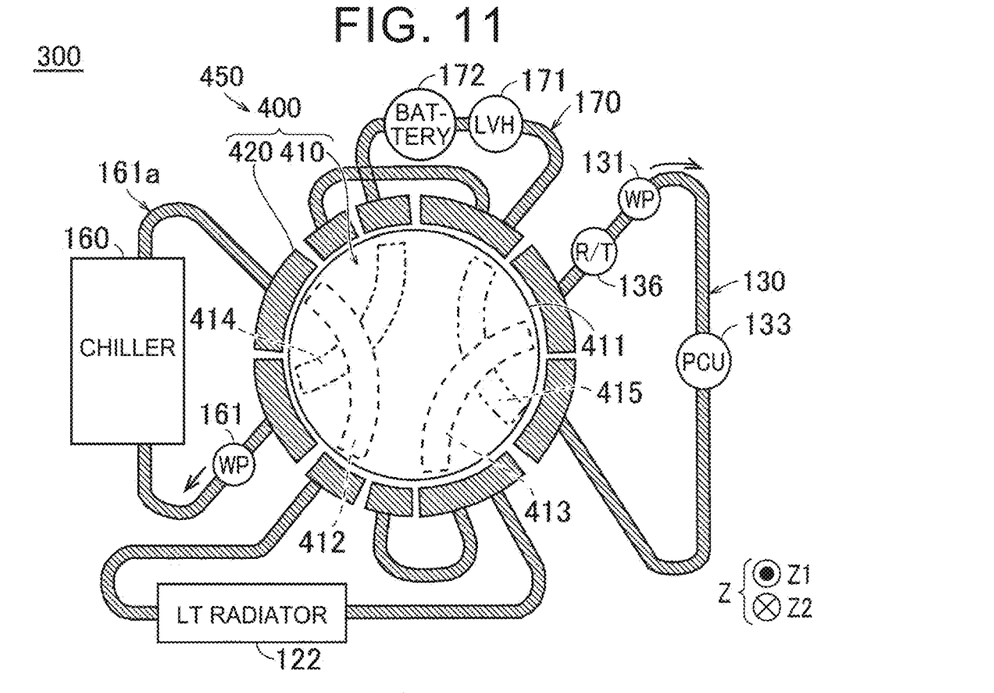
FIG. 11 is a diagram illustrating a configuration of a heat management circuit according to a second embodiment.

FIG. 11 is a schematic diagram illustrating the heat management circuit 300 according to the second embodiment. The heat management circuit 300 is different from the heat management circuit 100 of the first embodiment in that a switching device 450 (ten-way valve 400) is provided instead of the switching device 250 (ten-way valve 200) of the first embodiment. The ten-way valve 400 is an example of a "valve body unit" of the present disclosure.

The ten-way valve 400 is connected to a battery circuit 170, a unit circuit 130, a flow path 161a connected to the chiller 160, and a flow path connected to the low-temperature radiator 122.

The ten-way valve 400 includes an inner peripheral unit 410 and an outer peripheral unit 420. The outer peripheral unit 420 is disposed so as to surround the inner peripheral unit 410 from the outer peripheral side. That is, the outer peripheral unit 420 is formed in an annular shape.

Figure 12:
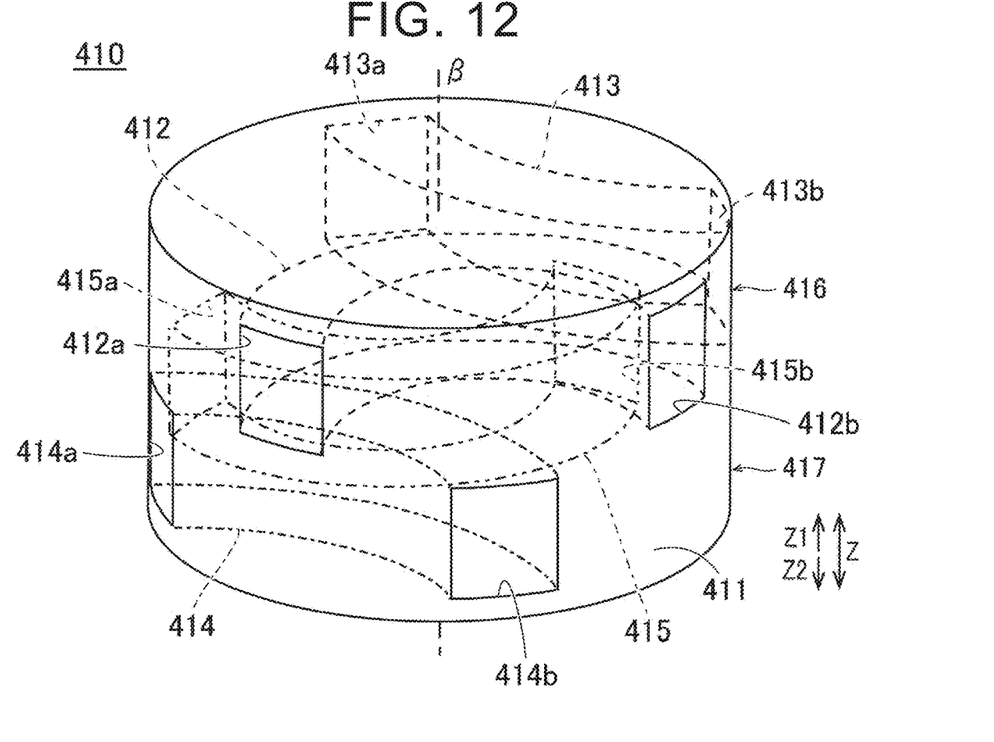
FIG. 12 is a perspective view showing the configuration of the inner peripheral unit of the ten-way valve according to the second embodiment.

The inner peripheral unit 410 rotates about a rotation center line R (see FIG. 12). The outer peripheral unit 420 is fixed without rotating. That is, the inner peripheral unit 410 rotates relative to the outer peripheral unit 420.

The inner peripheral unit 410 includes an outer peripheral wall 411 that extends annularly about a rotation center line R (see FIG. 12). Further, the inner peripheral unit 410 includes a groove 412, a groove 413, a groove 414, and a groove 415. Each of the grooves 415 from the groove 412 is formed so as to penetrate the inner peripheral unit 410. Although described in detail later, the groove 412 and the groove 413, the groove 414 and the groove 415, are arranged at different positions from each other in the Z direction. Note that the outer peripheral wall 411 is an example of the "first outer peripheral wall" of the present disclosure. Each of the groove 412 and the groove 413 is an example of a "first inner peripheral groove" of the present disclosure. Each of the groove 414 and the groove 415 is an example of a "second inner peripheral groove" of the present disclosure.

Each of the grooves 415 from the groove 412 is formed so as to extend in an arc shape when viewed from Z1 side. The groove 412 and the groove 413 are disposed so as to face each other so as to form a V-shape. The groove 414 and the groove 415 are disposed so as to face each other so as to form a V-shape. The V-shape formed by the groove 412 and the groove 413 is formed at a position where the V-shape formed by the groove 414 and the groove 415 is inverted by 180 degrees.

The groove 412 and the groove 414 are provided so as to cross each other when viewed from Z1 side. The groove 413 and the groove 415 are provided so as to cross each other when viewed from Z1 side.

FIG. 12 is a perspective view of the inner peripheral unit 410. The inner peripheral unit 410 is integrally formed by laminating a disk-shaped upper portion 416 and a disk-shaped lower portion 417. The inner peripheral unit 410 has a cylindrical shape. The upper portion 416 is disposed Z1 the lower portion 417. Note that the upper portion 416 and the lower portion 417 are examples of the "first portion" and the "second portion" of the present disclosure, respectively.

An opening 412a and an opening 412b are formed in the outer peripheral wall 411 at a Z-direction position (hereinafter, referred to as a position PU) corresponding to the upper portion 416. The groove 412 connects the opening 412a and the opening 412b. In the outer peripheral wall 411, an opening 413a and an opening 413b are formed in the position PU. The groove 413 connects the opening 413a and the opening 413b. Note that each of the opening 412a, opening 412b, opening 413a, and opening 413b is an example of the first inner peripheral opening of this disclosure.

An opening 414a and an opening 414b are formed in the outer peripheral wall 411 at a Z-direction position (hereinafter, referred to as a position PL) corresponding to the lower portion 417. The groove 414 connects the opening 414a and the opening 414b. In the outer peripheral wall 411, an opening 415a and an opening 415b are formed in the position PL. The groove 415 connects the opening 415a and the opening 415b. Note that each of the opening 414a, opening 414b, opening 415a, and opening 415b is an example of the second inner peripheral opening of this disclosure.

The openings of each of the grooves 415 from the groove 412 are spaced apart from each other in the circumferential direction of the inner peripheral unit 410.

Figure 13:
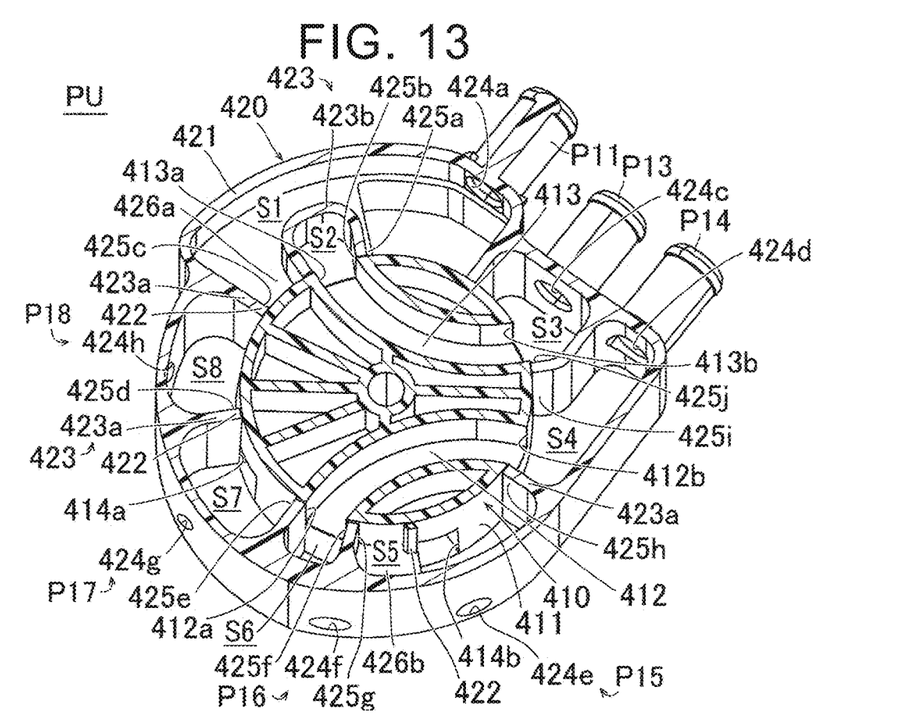
FIG. 13 is an oblique view showing a cross-section at the Z-direction position corresponding to the upper part of the tens valve according to the second embodiment.

FIG. 13 is a cross-sectional view of the ten-way valve 400 at the position PU of the inner peripheral unit 410. The outer peripheral unit 420 includes an outer peripheral wall 421, an inner peripheral wall 422, and a plurality of partition walls 423. Note that the outer peripheral wall 421 is an example of the "second outer peripheral wall" of the present disclosure.

Each of the outer peripheral wall 421 and the inner peripheral wall 422 extends in an annular shape about the rotation center line 3. The inner peripheral wall 422 is provided closer to the rotation center line R than the outer peripheral wall 421.

The plurality of partition walls 423 circumferentially define a space between the outer peripheral wall 421 and the inner peripheral wall 422. Thus, the space is partitioned from the eight grooves S1 to S8. Note that each of the grooves S1 to S8 is an exemplary "outer peripheral groove" of the present disclosure.

The partition wall 423 is formed to extend radially and includes a partition wall 423a connecting the outer peripheral wall 421 and the inner peripheral wall 422. In addition, a partition wall 423b that connects parts of the inner peripheral wall 422 that are provided at different circumferential positions is included. In the position PU, the groove S1 and the groove S2 are circumferentially partitioned by the partition wall 423b. The other adjacent grooves are circumferentially partitioned by the partition wall 423a. The partition wall 423b has a U-shape when viewed from Z1.

Opening 424h (see FIGS. 13 to 15) are formed from the opening 424a in the groove S8 from the groove S1. The opening 424h from the opening 424a are each communicating with P18 from the port P11 of the ten-way valve 400. Note that each of the opening 424a to the opening 424h is an exemplary "second outer peripheral opening" of the present disclosure.

The port P11 is an outlet port that exits the thermal medium toward the battery circuit 170. The port P12 is an inlet port through which the heat medium flows from the battery circuit 170. The port P13 is an outlet port through which the heating medium flows toward the unit circuit 130 (PCU 133 or the like). The port P14 is an inlet port through which the heating medium flows from the unit circuit 130 (PCU 133 or the like). The port P15 is an inlet port through which the thermal medium flows from the low-temperature radiator 122. The port P16 is an outlet port through which the thermal medium flows toward the low-temperature radiator 122. The port P17 is an outlet port through which the heat medium flows toward the chiller 160 (flow path 161a). The port P18 is an inlet port through which the heating medium flows from the chiller 160 (flow path 161a).

Ten openings are formed in the inner peripheral wall 422 of the outer peripheral unit 420 so as to be aligned in the circumferential direction. Specifically, an opening 425a, an opening 425b, an opening 425c, an opening 425d, an opening 425e, an opening 425f, an opening 425g, an opening 425h, an opening 425i, and an opening 425j are formed in the inner peripheral wall 422. Note that each of the openings 425a to 425j is an exemplary "first outer peripheral opening" of the present disclosure.

In the position PU, the width (unsigned) in the circumferential direction of each of the opening 425a, opening 425d, opening 425e, opening 425h, opening 425i, and opening 425j is approximately twice the width (unsigned) in the circumferential direction of each of the opening 425b, opening 425c, opening 425f, and opening 425g.

First, referring to FIG. 13, the opening 425j is described from the opening 425a in the position PU. From the opening 425a, the opening 425j are connected to the groove S1, groove S2, groove S1, groove S8, groove S7, groove S6, groove S5, groove S5, groove S4, and groove S3, respectively. That is, each of the groove S1 and the groove S5 communicates with two openings.

Figure 14:
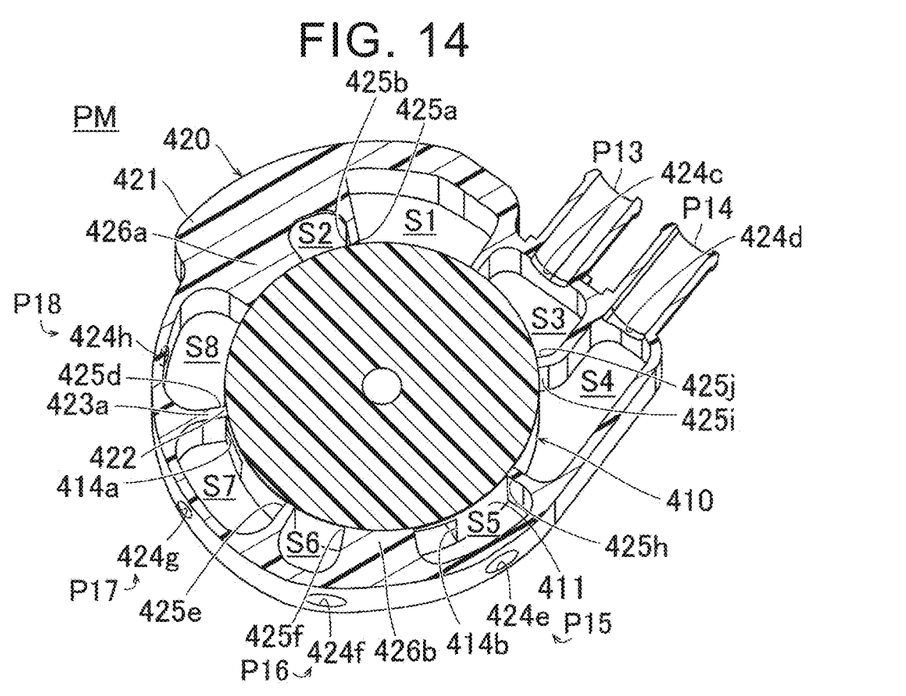
FIG. 14 is an oblique view showing a cross-section at the Z-position between the upper and lower parts of the tens valve according to the second embodiment.

FIG. 14 is a cross-sectional view of the ten-way valve 400 in the Z-direction position between the upper portion 416 and the lower portion 417 (position PM). As illustrated in FIG. 14, the outer peripheral unit 420 includes a partition portion 426a and a partition portion 426b. The partition portion 426a extends perpendicularly to the Z direction so as to partition the groove S1 and the groove S2 in the Z direction. The partition portion 426a is disposed at a circumferential position where the opening 425c is provided in FIG. 13. The partition portion 426b extends perpendicularly to the Z direction so as to partition the groove S5 and the groove S6 in the Z direction. The partition portion 426b is disposed at a circumferential position where the opening 425g is provided in FIG. 13.

Figure 15:
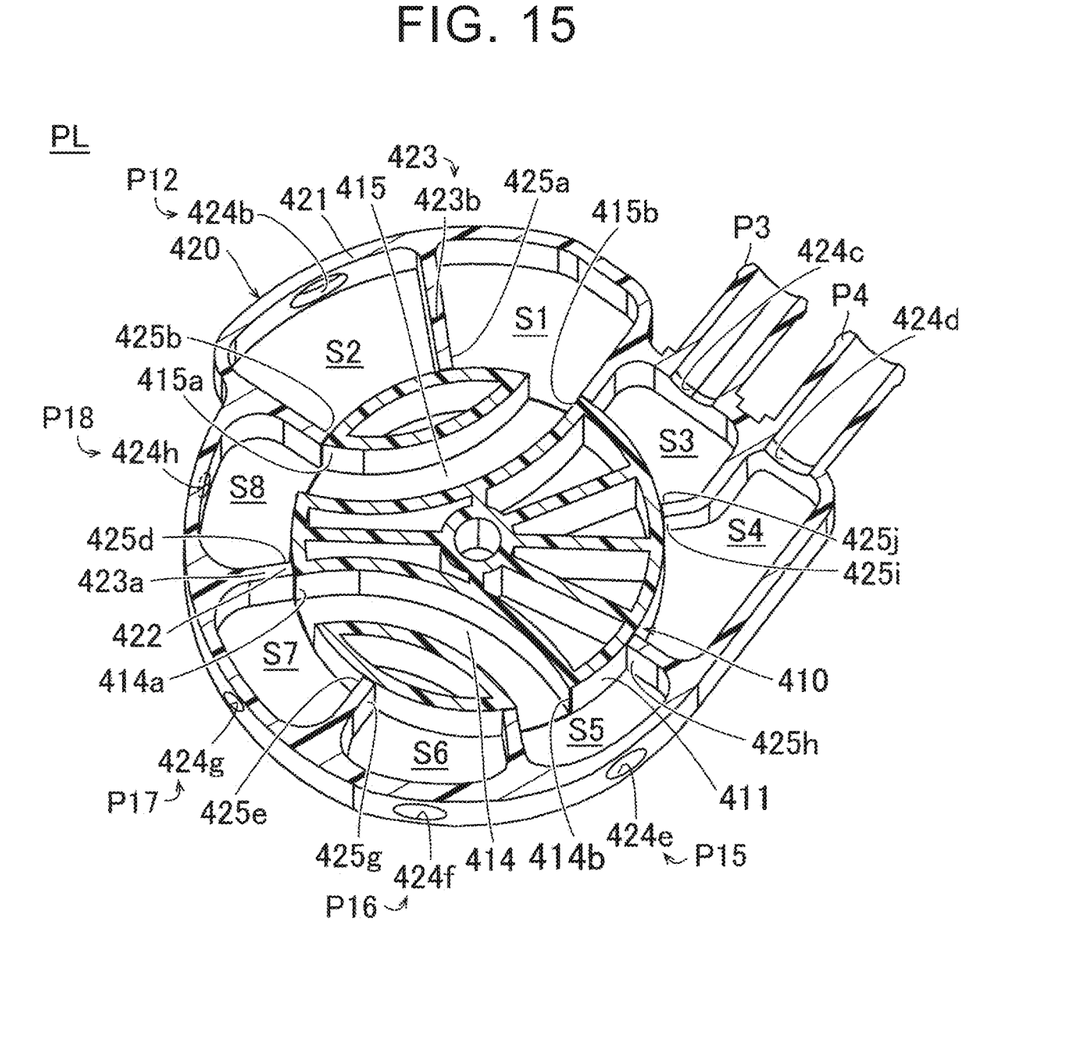
FIG. 15 is an oblique view showing a cross-section at the Z-direction position corresponding to the lower part of the ten-way valve according to a second embodiment.

FIG. 15 is a cross-sectional view of the ten-way valve 400 in the position PL. In the position PL, eight openings are formed in the inner peripheral wall 422 of the outer peripheral unit 420 so as to be arranged circumferentially. Specifically, the inner peripheral wall 422 has formed an opening 425a, opening 425b, opening 425d, opening 425e, opening 425g, opening 425h, opening 425i, and opening 425j.

In the position PL, the circumferential widths (unsigned) of the opening 425a, opening 425b, opening 425d, opening 425e, opening 425g, opening 425h, opening 425i, and opening 425j are abbreviated to each other.

As shown in FIG. 13, since each of the opening 425a and the opening 425c is in communication with the groove S1, the heat medium flowing from the opening 425a to the groove S1 in, for example, the position PL (see FIG. 15) is discharged from the groove S1 through the opening 425c in the position PU. Thus, the thermal medium bypasses the battery 172 by flowing through the groove S1 and moving from the opening 425a to the opening 425c.

Further, as shown in FIG. 13, since each of the opening 425g and the opening 425h is in communication with the groove S5, for example, the heat medium flowing from the opening 425g to the groove S5 in the position PU is discharged from the groove S5 through the opening 425h in the position PU. Thus, the thermal medium bypasses the low-temperature radiator 122 by flowing through the groove S5 and moving from the opening 425g to the opening 425h.

In the second embodiment, the inner peripheral unit 410 rotates, whereby the 10 openings (425j from 425a) of the outer peripheral unit 420 and the opening (412a, 412b, 413a, 413b, 414a, 414b, 415a, 415b) of the inner peripheral unit 410 are radially overlapped with each other. Thus, as in the first embodiment, H is formed from the circuit pattern A in the heat management circuit 300.

Note that the other configurations are the same as those of the first embodiment, and therefore, repeated description will not be given.

In the above embodiment, an example in which the high-temperature circuit 110 is provided in the heat management circuit has been described, but the present disclosure is not limited thereto. The high-temperature circuit 110 may not be provided in the heat management circuit.

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A switching device to be provided in a heat management circuit through which a heat medium flows, the switching device comprising:
   a valve body unit; and
   a plurality of flow pipes connected to the valve body unit, wherein:
   the valve body unit includes
       a disc-shaped first valve body,
       a disc-shaped second valve body provided to be rotatable relative to the first valve body about a rotation center line, and disposed on one side of the first valve body in an axial direction in which the rotation center line extends, and a disc-shaped third valve body sandwiched in the axial direction by the first valve body and the second valve body, and provided to be rotatable relative to the first valve body about the rotation center line;

the first valve body includes
- an outer peripheral wall extending annularly about the rotation center line,
- an inner peripheral wall extending annularly about the rotation center line and provided closer to the rotation center line than the outer peripheral wall, and
- ten partition walls provided to partition a space between the inner peripheral wall and the outer peripheral wall in a circumferential direction about the rotation center line;

the first valve body has ten first grooves defined by the ten partition walls between the outer peripheral wall and the inner peripheral wall;

each of the ten first grooves includes a first opening that is open toward the second valve body, and a second opening provided in the outer peripheral wall;

the second opening of a subset of the ten first grooves allows the heat medium to flow into the first valve body through the flow pipes, and the second opening of the remaining of the ten first grooves allows the heat medium to flow out of the first valve body through the flow pipes;

the second valve body has a plurality of fan-shaped second grooves that extends circumferentially about the rotation center line and is open toward the first valve body;

the third valve body has a plurality of through holes that passes through the third valve body in the axial direction and is arranged circumferentially about the rotation center line; and the second valve body and the third valve body are configured to rotate relative to the first valve body to switch states of overlap of the first openings of the ten first grooves, the second grooves, and the through holes in the axial direction.

* * * * *